(12) United States Patent
Nochimowski et al.

(10) Patent No.: US 8,370,402 B2
(45) Date of Patent: *Feb. 5, 2013

(54) DUAL REPRESENTATION OF STORED DIGITAL CONTENT

(75) Inventors: Alain Nochimowski, Tel Aviv (IL); Micha Rave, Herzliya (IL)

(73) Assignee: Sandisk IL Ltd, Kfar Saba (IL)

( * ) Notice: Subject to any disclaimer, the term of this patent is extended or adjusted under 35 U.S.C. 154(b) by 365 days.

This patent is subject to a terminal disclaimer.

(21) Appl. No.: 12/177,006

(22) Filed: Jul. 21, 2008

(65) Prior Publication Data

US 2009/0172050 A1    Jul. 2, 2009

Related U.S. Application Data

(60) Provisional application No. 61/018,644, filed on Jan. 2, 2008, provisional application No. 61/018,979, filed on Jan. 4, 2008, provisional application No. 61/082,094, filed on Jul. 18, 2008.

(51) Int. Cl.
G06F 7/00 (2006.01)
G06F 17/30 (2006.01)

(52) U.S. Cl. ........................ 707/812; 711/114
(58) Field of Classification Search .......... 707/600–831, 707/999.2; 711/161, 162, 168–170, 173, 711/202, 203, 114
See application file for complete search history.

(56) References Cited

U.S. PATENT DOCUMENTS

| | | | |
|---|---|---|---|
| 5,509,134 A * | 4/1996 | Fandrich et al. ............. 711/103 |
| 6,745,286 B2 | 6/2004 | Staub et al. | |
| 6,748,467 B2 | 6/2004 | Yamamoto | |
| 6,986,030 B2 | 1/2006 | Shmueli et al. | |
| 7,085,879 B2 | 8/2006 | Aasheim et al. | |
| 7,143,420 B2 | 11/2006 | Radhakrishnan | |
| 7,406,489 B2 | 7/2008 | Soini et al. | |
| 7,747,837 B2 * | 6/2010 | Gorobets et al. ............. 711/203 |
| 2004/0088417 A1 | 5/2004 | Bober et al. | |
| 2004/0243793 A1 | 12/2004 | Tang | |
| 2005/0160053 A1 | 7/2005 | Okamoto et al. | |
| 2005/0193161 A1 | 9/2005 | Lee et al. | |
| 2005/0203872 A1 | 9/2005 | Kwong Kwan | |
| 2005/0268339 A1 | 12/2005 | Bobrow | |
| 2006/0079284 A1 | 4/2006 | Lu et al. | |
| 2006/0107062 A1 | 5/2006 | Fauthoux | |
| 2006/0107330 A1 | 5/2006 | Ben-Yaacov et al. | |
| 2006/0288166 A1 | 12/2006 | Smith, Jr. et al. | |
| 2007/0033373 A1 | 2/2007 | Sinclair | |
| 2007/0038567 A1 | 2/2007 | Allaire et al. | |
| 2007/0050538 A1 | 3/2007 | Northcutt et al. | |
| 2007/0056042 A1 | 3/2007 | Qawami et al. | |

(Continued)

FOREIGN PATENT DOCUMENTS

GB    2 400 707    10/2004
WO    WO 01/88780    11/2001

(Continued)

OTHER PUBLICATIONS

John Kubiatowicz et al., OceanStore: An Architecture for Global-Scale Persistent Storage, 2000, A.C.M, 190-201.*

(Continued)

*Primary Examiner* — Jean B Fleurantin
(74) *Attorney, Agent, or Firm* — Brinks Hofer Gilson & Lione

(57) ABSTRACT

Various methods, devices and systems are described for providing dual representation of stored digital content are described where the dual representation includes logical block data and corresponding data objects. Data object property information is synchronized with the data objects.

17 Claims, 6 Drawing Sheets

U.S. PATENT DOCUMENTS

| | | | |
|---|---|---|---|
| 2007/0156998 A1 | 7/2007 | Gorobets | |
| 2007/0186279 A1 | 8/2007 | Zimmer et al. | |
| 2007/0198634 A1 | 8/2007 | Knowles | |
| 2007/0198715 A1 | 8/2007 | Knowles | |
| 2007/0198716 A1 | 8/2007 | Knowles | |
| 2007/0198734 A1 | 8/2007 | Knowles | |
| 2007/0218945 A1 | 9/2007 | Agami et al. | |
| 2008/0027983 A1 | 1/2008 | Erol et al. | |
| 2008/0052781 A1 | 2/2008 | Bogot et al. | |
| 2008/0096559 A1 | 4/2008 | Phillips et al. | |
| 2008/0126680 A1 | 5/2008 | Lee et al. | |
| 2008/0147962 A1 | 6/2008 | Diggs et al. | |
| 2008/0270725 A1 | 10/2008 | Roden et al. | |
| 2008/0301396 A1 | 12/2008 | Hamada et al. | |
| 2009/0043984 A1* | 2/2009 | Chang et al. | 711/173 |
| 2009/0094160 A1 | 4/2009 | Webster et al. | |
| 2009/0171891 A1 | 7/2009 | Nochimowski et al. | |
| 2009/0171911 A1 | 7/2009 | Nochimowski et al. | |
| 2009/0172217 A1 | 7/2009 | Nochimowski et al. | |
| 2009/0172274 A1 | 7/2009 | Nochimowski et al. | |
| 2009/0172275 A1 | 7/2009 | Nochimowski et al. | |
| 2009/0172276 A1 | 7/2009 | Nochimowski et al. | |
| 2009/0172400 A1 | 7/2009 | Rave et al. | |
| 2009/0172694 A1 | 7/2009 | Nochimowski et al. | |

FOREIGN PATENT DOCUMENTS

| | | |
|---|---|---|
| WO | WO 2005/125072 | 12/2005 |
| WO | WO 2007/019258 | 2/2007 |
| WO | WO 2007/044947 | 4/2007 |

OTHER PUBLICATIONS

Search Report dated Sep. 10, 2010 in EP Application No. 10 007 973.0, All Pages.
Office Action dated Oct. 6, 2010 in U.S. Appl. No. 12/059,107, All Pages.
Office Action dated Oct. 5, 2010 in U.S. Appl. No. 12/123,304, All Pages.
Office Action dated Sep. 3, 2010 in U.S. Appl. No. 12/123,252, All Pages.
International Search Report dated Aug. 7, 2009 in PCT Application No. PCT/US2008/087695, All Pages.
Written Opinion dated Aug. 7, 2009 in PCT Application No. PCT/US2008/087695, All Pages.
Potter et al., "WebPod: Persistent Web Browsing Sessions with Pocketable Storage Devices," Proceedings of the 14th International Conference on the World Wide Web, [Online] May 14, 2005, pp. 603-612.
Lahti et al., "A Mobile Phone-based Context-aware Video Management Application," Proceedings of SPIE—The International Society for Optical Engineering 2006 SPIE, vol. 6074, All Pages.
Ravi et al., "Securing Pocket Hard Drives," IEEE Pervasive Computing, IEEE Service Center, Los Alamitos, CA, vol. 6, No. 4, Oct. 1, 2007, pp. 18-23.
Anciaux et al., "A Tamper-Resistant and Portable Healthcare Folder," International Journal of Telemedicine and Applications, vol. 2008, 9 pgs., 2008.
Baird et al., "Distributed Information Storage Architecture," Twelfth IEEE Symposium on Mass Storage Systems, 1993, pp. 1051-9173.
Melazzi et al., "The Simplicity Project: easing the burden of using complex and heterogeneous ICT devices and services," URL: http://www.ist-simplicity.org/_publications/Mobile%20Summit%202004%20-%20Paper%20State%20of%20Art.pdf, 8 pages, Jun. 27-30, 2004.
U.S Appl. No. 11/964,060, filed Dec. 26, 2007.
U.S Appl. No. 11/967,938, filed Dec. 31, 2007.
Wang, Jinghua, "VHE Smart Card Manager," URL: http://jerry.c-lab.de/vhelab/r_smartcard.html, Feb. 7, 2003, All Pages.
www.allinyourpocket.com, "All your files in your pocket!" downloaded Apr. 15, 2008, All Pages.
Office Action issued in U.S. Appl. No. 12/059,107, dated Apr. 4, 2011 (9 pages).
Office Action issued in U.S. Appl. No. 12/029,356, dated Dec. 27, 2010 (13 pages).
Office Action issued in U.S. Appl. No. 12/029,356, dated Mar. 25, 2011 (40 pages).
Office Action issued in U.S. Appl. No. 12/019,573, dated Mar. 1, 2011 (33 pages).
Office Action issued in U.S. Appl. No. 12/123,304, dated Mar. 11, 2011 (12 pages).
Office Action issued in U.S. Appl. No. 12/101,065, dated Dec. 7, 2010 (8 pages).
Office Action issued in U.S. Appl. No. 12/101,065, dated Feb. 25, 2011 (8 pages).
Office Action issued in U.S. Appl. No. 12/045,472, dated May 9, 2011 (12 pages).
Office Action issued in U.S. Appl. No. 12/123,252, dated Apr. 11, 2011 (12 pages).
Hennessy et al., Computer Organization and Design, Morgan Kaufmann Publishers, Inc., second edition, pp. 675-678.
Mani et al., SenSys '06, Nov. 1-3, 2006, Boulder, Colorado, USA ACM, pp. 425-426.
Sim Application Toolkit (SAT) [online], May 19, 2007 [retrieved on Dec. 13, 2010] from URL: http://www.sanjayahuja.com/tutorials/SimApplicationToolkit.html, 1 page.
Zeinalipour-Yazti et al., "MicroHash: An Efficient Index Structure for Flash-Based Sensor Devices," FAST 05, pp. 1-14.
Office Action for U.S. Appl. No. 12/101,065, dated Feb. 9, 2012, 9 pages.
Office Action for U.S. Appl. No. 12/036,440, dated Mar. 5, 2012, 27 pages.
Office Action for U.S. Appl. No. 12/019,573, dated Dec. 8, 2011, 27 pages.
Notice of Allowance for U.S. Appl. No. 12/045,472, dated Oct. 27, 2011, 5 pages.
Office Action for U.S. Appl. No. 12/059,107, dated Jan. 3, 2012, 7 pages.
Office Action for U.S. Appl. No. 12/123,252, dated Oct. 21, 2011, 13 pages.
Office Action for U.S. Appl. No. 12/177,006, dated Dec. 6, 2011, 10 pages.
Examiner's Report for European Patent Application Serial No. 08 870 111.5, dated Jan. 20, 2011, 6 pages.
European Search Report for European Patent Application Serial No. 10 007 974.8, dated Jan. 20, 2011, 6 pages.
Ex Parte Quayle Action for U.S. Appl. No. 12/019,573, dated Jul. 17, 2012, 5 pages.
Notice of Allowance for U.S. Appl. No. 12/036,440, dated Jun. 22, 2012, 19 pages.
Office Action for U.S. Appl. No. 12/101,065, dated Jun. 19, 2012, 10 pages.
Office Action for U.S. Appl. No. 12/123,252, dated Jul. 2, 2012, 13 pages.
Office Action for U.S. Appl. No. 13/355,146, dated Jul. 16, 2012, 17 pages.

* cited by examiner

DUAL REPRESENTATION OF STORED DIGITAL CONTENT

CROSS REFERENCE TO RELATED APPLICATIONS

This patent application takes priority under 35 U.S.C. 119 (e) to (i) U.S. Provisional Patent Application No. 61/082,094 filed on Jul. 18, 2008 entitled "DUAL REPRESENTATION OF STORED DIGTAL CONTENT" by Nochimowski et al., (ii) U.S. Provisional Patent Application No. 61/018,644 filed on Jan. 2, 2008 entitled "DISTRIBUTED STORAGE SERVICE SYSTEMS AND ARCHITECTURE" by Nochimowski et al., and (iii) U.S. Provisional Patent Application No. 61/018,979 filed on Jan. 4, 2008 entitled "DISTRIBUTED STORAGE SERVICE SYSTEMS AND ARCHITECTURE" by Nochimowski et al. each of which are incorporated by reference in their entirety for all purposes.

This application is also related to co-pending (i) U.S. patent application Ser. No. 12/019,573 filed on Jan. 24, 2008 entitled "DISTRIBUTED STORAGE SERVICE SYSTEMS AND ARCHITECTURE" by Nochimowski et al., (ii) U.S. patent application Ser. No. 12/019,573 filed on Feb. 11, 2008 entitled "DISTRIBUTED STORAGE SERVICE SYSTEMS AND ARCHITECTURE" by Nochimowski et al., (iii) U.S. patent application Ser. No. 12/029,356 filed on Mar. 31, 2008 entitled "DATA USAGE PROFILING BY LOCAL STORAGE DEVICE" by Nochimowski et al. and (iv) U.S. patent application Ser. No. 12/123,252 entitled "DATA INDEXING BY LOCAL STORAGE DEVICE" filed May, 19, 2008 by Nochimowski et al. which are each incorporated by reference in its entirety for all purposes.

FIELD OF THE INVENTION

The present invention relates generally to digital devices. More particularly, the present invention relates to providing improved storage services.

BACKGROUND

The number and kind of portable (i.e., small form factor, hand held) consumer electronic products on the market is exploding. These portable consumer electronic products include, for example, PDAs, media players, cellular phones, and cameras. For competitive and other reasons, these consumer electronic products have increased their functionality. For example, cellular phones have added PDA and camera functionality, PDAs have added cellular phone and music player functionality, media players have added PDA and video game functionality, and so on.

In order to provide its primary function, a portable consumer electronic product uses a host device to execute a host application that uses content stored in a conventional mass storage device. The host application, in turn, can provide both core services directly related to the primary function of the hand held consumer product and ancillary services related to the manipulation and management of the content stored in the storage device. For example, in order for a media player to play a media file, such as an MP3 file, the host application can use a core application in the form of a media player application to retrieve and play a music file (in the form of an MP3 file) stored in the storage device. The host application can also use an ancillary services application to provide a user with the capability of managing the music files stored in the storage device. Such user management can include playlist manipulation and generation, sorting and searching for a specific music file, music genre, artist, etc. In the case of a media player arranged to display images (both still and video) the core application can take the form of a photo display and editing application that provides a user with touch-up capabilities such as red eye reduction, black and white conversion, image cropping and rotation. An associated ancillary services application can take the form of an image and or video management program that allows a user to sort, store and catalog images.

Therefore, a host application can be called upon to provide both core services (such as playing an MP3 file, displaying an image file, or playing a video file (MP4)) and ancillary services related to content management and manipulation (sorting and cataloging imaging, sorting MP3 files, playlist editing, content searching, indexing and so on). However, regardless of whether the host application is called upon to provide a core or ancillary service, the host application must access data stored in the storage device where all files are stored using a logical block format. Storing data in a logical block format does not typically present an undue burden to the core application (playing a music file, for example), however, since mass storage devices operate at the granularity of a mass storage device block, rather than at the logical file level, ancillary services may not be optimally configured. This is especially true since many files (such as MP3) are of a predetermined size, they are stored more naturally as a data object and not as the logical blocks imposed by the conventional mass storage device.

Since these portable products have both limited processing resources and available RAM., difficulties can arise when the portable consumer electronic product is called upon to perform process intensive tasks requiring the host application (in particular the ancillary application) to process data stored as logical blocks that would more naturally be stored as a data object. In particular, it is typically the search/query operations (i.e. 'read-related' commands) that consume the most processing resources of the host in the context of ancillary services that can result in excessive power consumption by a host processor and long execution times resulting in slow responsiveness. In this way, the user may be left with a negative user experience since users usually do not like a product that is slow and whose battery life is short.

Therefore, improving performance and therefore the user experience of the portable electronic device is highly desirable by, for example, facilitating the execution of ancillary storage services by the host application.

SUMMARY OF THE DESCRIBED EMBODIMENTS

According to different embodiments, various methods, devices and systems are described for providing storage services. One embodiment describes a system. The system includes at least a data storage array, a first logical interface adapted for managing data stored in the data storage array as logical data blocks, and a second logical interface adapted for managing data objects corresponding to the data stored as logical data blocks. When at least some of the data stored as logical data blocks is modified by way of the first logical interface, the modified data is accessible by way of both the first and the second logical interfaces where the being accessible by way of the second logical interface involves updating a predetermined set of data object properties corresponding to the modified data.

Another embodiment describes local storage device (LSD). The local storage device includes a data storage array, a first logical interface adapted for managing data stored in the data storage array as logical data blocks; and a second logical interface adapted for managing data objects corresponding to the data stored as logical data blocks. When at least some of the data stored as logical data blocks is modified by way of the first logical interface, the modified data is accessible by way of both the first and the second logical interfaces where the being accessible by way of the second logical interface involves updating a predetermined set of data object properties corresponding to the modified data In yet another embodiment, a method is described. The method can be carried out by at least the following operations. Modifying data by way of a first interface where the data is stored in a first portion of a memory array as logical blocks, managing data objects corresponding to the data stored as logical data block by way of a second interface, updating a predetermined set of data object properties of a data object corresponding to the modified data by way of the second interface, wherein the updated predetermined set of data object properties is stored in a second portion of the memory array, and accessing the modified data by way of the first and the second interface.

In still another embodiment, a LSD is described. The LSD includes at least a first interface, a second interface, and a memory array. The memory array includes a first portion accessible by way of the first interface arranged to store data as logical blocks, wherein the data stored as logical blocks is modified by way of the first interface where the modified data is accessible by way of the first interface and the second interface. The memory array also includes a second portion arranged for storing at least a predetermined set of data object properties of a data object corresponding to the data stored as logical blocks. The LSD also includes a synchronization unit coupled to the first and the second interface where accessing the modified data by way of the second interface involves updating the predetermined set of data object properties stored in a second portion of the memory array by the synchronization unit when the data stored as logical blocks is modified.

DETAILED DESCRIPTION OF THE DESCRIBED EMBODIMENTS

Figure 1:
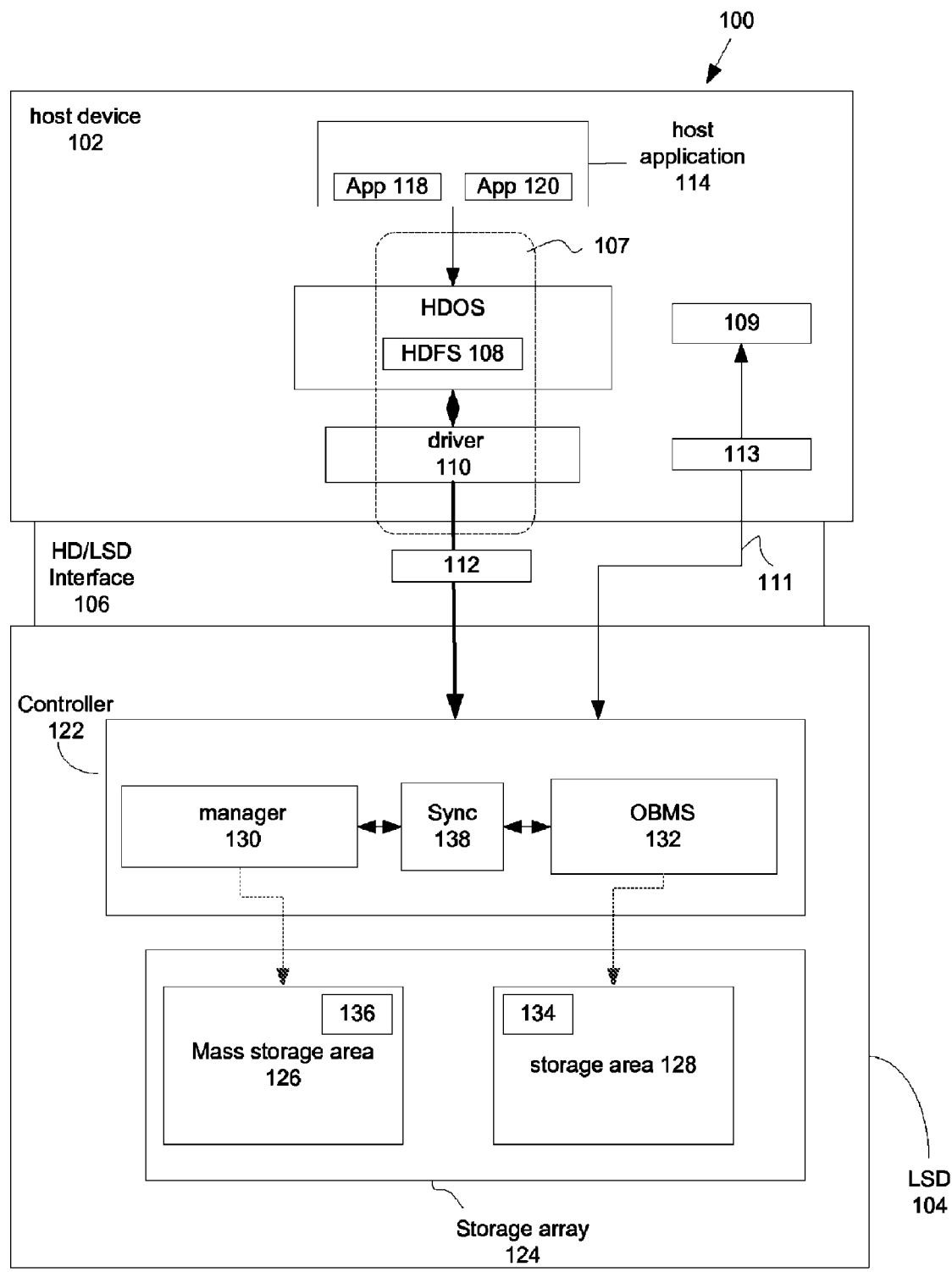
FIG. 1 illustrates a system including a host device (HD) and a local storage device (LSD).

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

The exemplary embodiments can pertain to an electronic system that includes a memory device discussed above. Memory devices (i.e., memory cards) are commonly used to store digital data for use with various electronics products. The memory device is often removable from the electronic system so the stored digital data is portable. The memory devices according to such embodiments can have a relatively small form factor and be used to store digital data for electronics products that acquire data, such as cameras, hand-held or notebook computers, network cards, network appliances, set-top boxes, hand-held or other small media (e.g., audio) players/recorders (e.g., MP3 devices) and so on.

In order to provide greater functionality and therefore user satisfaction, the latest portable consumer electronic products (in particular the processor included in a host device) are being asked to perform more user support (ancillary) functions in addition to those core services (media player, for example) already provided. However, since these portable consumer electronic products have both limited processor resources and RAM, any additional functions can cause the processor to run slow and consume excessive power resulting in a less than favorable user experience. One of the most used and relied upon ancillary services (especially in light of the large number of stored data files made accessible to the user) are search/query functions and other such related read functions. The search/query function can be problematic when applied to high capacity memory devices when data is stored strictly as logical blocks. For example, SanDisk Inc. located in Milpitas, Calif. is a worldwide Flash memory vendor that is currently selling 8 GB Flash memory cards for mobile devices and has announced support for 16 GB. This capacity will only grow larger as time goes on and competition expands. Such high capacity memories of this size can accommodate literally thousands of image files (JPEG), music files (MP3) or hundreds of video files (MP4).

With such a large number of stored data files, any search/query function can consume large amounts of processor resources and take excessive time to complete. This is particularly true since in conventional mass storage devices, content is stored at the granularity of logical blocks whereas search/query functions can be more efficiently performed when the data is stored at the granularity of a data object. For example, database management languages (e.g. SQL) are notably well suited to query or manipulate data at the granularity of objects (e.g. retrieval of data that can possibly be organized in a relational manner, as per a relational data base management system or DBMS via the SELECT command in the case of SQL). Since it is typically the search/query operations (i.e. 'read-related' commands) that consume the most processing resources of the host processor in the context of ancillary services, it would be beneficial for the overall improvement of the performance of ancillary services (and the system as a whole) if query languages (such as database management languages such as SQL) could be used in portable consumer electronic products to preferably perform read operations such as query/search and so on. It should also be noted even though database languages such as SQL also cover 'write-related commands' (e.g. CREATE, ALTER or INSERT, UPDATE, DELETE), the most advantageous use of such database languages in the context of improving the performance of portable consumer electronics products would be for execution of read functions such as query.

Object transfer protocols such as Picture Transfer Protocol (PTP) or Media Transfer Protocol (MTP) each by Microsoft Corporation are other examples of object based management protocols. An object protocol is particularly well suited to transferring files that contain a predetermined amount of data such as a digital photograph or an MP3 music file. For example, such protocols may be used to transfer digital photographs between a digital camera and a PC or to transfer MP3 music files from a host computer (such as a PC) to an MP3 player. It should be noted that object transfer protocols (such as MTP) are more focused on 'write-related' commands (e.g. CopyObject, MoveObject etc.), however, they also cover 'read-related' commands (e.g. GetPartialObject, GetObjectPropValue etc.).

Although storing all content as data objects instead of logical blocks may appear to be the answer to this problem, in order to maintain backward compatibility with legacy products and installed base, a complete switch to an "object oriented" paradigm is both counterproductive and unnecessary.

Hence, in accordance with various embodiments, a more efficient allocation of host device computing resources is implemented by providing dual representation of content stored in the memory array of a local storage device (LSD) in communication with the host device. By dual representation, it is meant that the content stored in the LSD is provided in both a logical block representation (i.e., accessible via legacy mass storage interfaces) and as an object representation accessible via a data object interface where the object or object properties can be manipulated. A dual representation of the stored content provides for streamlining the operations of the host application by providing data in a form most suitable for the requesting application. Moreover, a synchronization service is performed that provides for the synchronization of the stored content between the logical block representation and the object representation. More specifically, the synchronization provides for synchronizing object property information stored in one portion of a storage array and the corresponding object stored in a mass storage portion of the array. Accordingly, there is provided at least a memory array logically configured to provide a dual representation of stored content in both a logical block representation and as a data object representation as well as a synchronization service that assures object properties are current.

In this way, whichever representation is best suited for efficient execution of a particular component of the host application can be readily accessed. For example, if the host device is a multimedia player and a core application is an MP3 decoder, then the MP3 decoder will preferentially access MP3 files stored as logical blocks. However, if a user of the multimedia player wishes to search all available audio files stored in the memory array, then a search application will preferentially use the stored content represented as objects, relying on object properties for example, to complete the search request. It should be noted that in an object oriented environment, object metadata refers to a pre-defined set of properties considered to be part of the object itself, such as in a header. In addition to object information, however, the described embodiments also consider object properties that can be defined externally to the object (such as by a LSD in which the object is stored) and not necessarily conveyed with it. For example, a number of times that an object has been accessed and/or played, etc. can be considered to be an object property.

The dual representation of the stored content can include content stored in a mass storage portion of the memory array at the granularity of a logical block as well as at the granularity of an object. Object properties associated with the stored object can be stored in a portion of the storage array logically or physically separate from that portion in which the object itself is stored. For example, the object can be a public portion (i.e., a portion visible to the HDFS) of the storage array whereas the object properties can be stored in a private portion of the memory array. Furthermore, the invention provides for synchronizing the object properties corresponding to the object having correspondingly same content stored in the block representation. In this way an object stored in the mass storage portion can have associated object properties (stored as a file, table, etc.) stored in the other portion of the memory array. It is the function of a synchronizer to assure that any changes to the stored object is reflected in the associated properties.

In a specific embodiment well suited for small form factor use, the storage device can take the form of a local storage device (LSD) described in U.S. patent application Ser. No. 12/019,573 filed on Jan. 24, 2008 entitled "DISTRIBUTED STORAGE SERVICE SYSTEMS AND ARCHITECTURE" by Nochimowski et al incorporated by reference.

Exemplary embodiments of the invention are discussed below with reference to FIGS. 1-6. However, those skilled in the art will readily appreciate that the detailed description given herein with respect to these figures is for explanatory purposes as the invention extends beyond these limited embodiments. It should be noted that it is contemplated that the invention can be used for any type of local data storage devices that can include non-volatile memory such as Multi Media Card (MMC) and Secure Digital Card (SD).

FIG. 1 illustrates a computing system 100 including a host device (HD) 102 and a local storage device (LSD) 104. LSD 104 can take the form of removable memory devices such as a memory card having a relatively small form factor and can be used to store digital data for electronics products such as cameras, hand-held or notebook computers, network cards, network appliances, set-top boxes, hand-held or other small audio players/recorders (e.g., MP3 devices), and medical monitors. Examples of a memory card include PC Card (formerly PCMCIA device), Flash card (e.g., Compact Flash Type I and II), Secure Digital (SD) card, Multimedia card (MMC), ATA card (e.g., Compact Flash card), memory stick, SmartMedia card. In addition, LSD 104 can take the form of non-removable memory devices such as SD compatible iNAND™ embedded Flash drive manufactured by SanDisk Corporation of Milpitas Calif.

LSD 104 can communicate with host device 102 by way of HD/LSD interface 106. It should be noted that HD/LSD 106 can be configured as a mechanical entity (such as a socket or interconnecting bus) into which HD 102 and LSD 104 can mechanically connect. In some embodiments, HD/LSD 106 can take the form of a wireless interface. HD 102 includes a processor. However, for the sake of clarity, the processor included in HD 102 is neither shown nor mentioned further in this discussion but is, nonetheless, presumed to be present. Typically, LSD 104 does not utilize any interface to a device external to HD 102 other than that interface provided by the HD 102.

HD 102 includes legacy mass storage path 107. Legacy mass storage path 107 includes host device file system (HDFS) 108 (which is typically part of the host device operating system (HDOS)) in communication with legacy mass storage driver 110. It should be noted that HDFS 108 can be configured to operate based upon any number of file systems. For example, HDFS 108 can be a file allocation table (FAT) based file system. However, in other embodiments, HDFS 108 may be a file system based on ext2, ext3, NTFS and JFFS amongst others. Thus, while the invention may be practiced with other file systems, the following description focuses on FAT-based file system embodiments. By way of example, the FAT file system may be a FAT-16 or FAT-32 file system known in the art.

In the described embodiment, HDFS 108 can issue LSD block command 112 to LSD 104 using the mass storage path 107. Legacy mass storage driver 110 can, in turn, pass LSD block command 112 to LSD 104 by way of HD/LSD interface 106. In order to utilize an object representation of data stored in LSD 104, HD 102 can utilize object based (OB) interface 109 configured to convey object-related commands 113 over the HD/LSD storage (physical) interface/bus 106 to LSD 104. It is contemplated that OB interface 109 can be integrated at the driver level or at the OS level or even at the application level (in which case it will partially use the mass storage path 107). In the described embodiment, OB interface 109 can utilize a logical IP (internet protocol) network interface in which case OB interface 109 can convey application, object-based protocols usually defined over IP (e.g. SQL over IP, or MTP over IP etc.)

HD 102 can also include host application 114 that can utilize HDFS 108 and legacy mass storage driver 110 to communicate with LSD 104. Host application 114 can include core application 118 arranged to provide core services (play media files, display images, etc.) and ancillary services application 120 arranged to provide ancillary services (keyword search, modify playlist, etc.) that can be used to assist host application 114 in management and/or execution of content stored in LSD 104. It should be noted that ancillary services can also be run from LSD 104 without support from host application 114. In this way, LSD 104 can provides its own set of ancillary services independent of HD 102 or in support of HD 102 in those cases deemed appropriate. It should also be noted that such ancillary services can operate at any level of the architecture described herein. For example, application 120 could well be part of the operating system (OS). Furthermore, application 120 can be a remote application that uses the object-based representation of stored data in LSD 104 where application 120 can reside in a remote device or another LSD separate from LSD 104 but in communication with HD 102/LSD 104.

LSD 104 can include controller 122 and storage array 124 configured (either logically or physically) to include at least first portion 126 and second portion 128. It should be noted that storage array 124 can be formed of an array of memory cells (such as FLASH). In this particular case, even though storage array 124 can be presumed to be an array of FLASH memory cells, the embodiments are not limited to only FLASH type memory cells since it is contemplated that the embodiments can be used with any appropriate type of memory cell. Controller 122 can include Flash manager 130 that can manage at least first portion 126 acting at the behest of HDFS 108. It should also be noted that Flash manager 130 can serve as a translation layer between HDFS 108 and memory array 124. More specifically, flash manager 130 can translate between commands received from HDFS 108 targeting logical addresses/units (e.g. clusters) into actions performed on the physical addresses/units (e.g. blocks, pages etc.) within mass storage region 126. In a particularly useful arrangement, data can be stored in first portion 126 using LBA protocol. Accordingly, the location of blocks of data stored in mass storage area 126 can be specified using LBA protocol where each block can be, for example, on the order of 512 or 1024 bytes each. In this way, mass storage area 126 can be fully backward compatible with any contemplated legacy mass storage architectures (i.e. able to work in conjunction with legacy hosts). LSD 104 can therefore operate using legacy interfaces, busses, and all associated protocols providing for full compatibility with installed base of legacy products. In this way, mass storage area 126 can be used to store data represented as a data object or as a logical data block.

Controller 122 can include object based management system (OBMS) 132 arranged to provide object management services to second portion 128 that can be used to store and retrieve data object property information 134 representative of and corresponding to data object 136 stored in mass storage area 126. A typical example of such an OBMS 132 can be a database management system (DBMS) designed to control the organization, storage, management and retrieval of data in a database (DB). The OBMS can be responsive to any DB query/management language (such as. SQL). Accordingly, objects can be stored in area 128 according to a DB format, or more particularly as data structures (i.e; fields, records, files and objects). OBMS 132 can utilize FLASH manager 130 to access/manage areas 126 and 128 by providing a logical object management layer on top of FLASH manager 130. In some embodiments, however, OBMS 132 can embed its own Flash Management layer separate from Flash manager 130.

Object management services provided by OBMS 132 can include retrieving and storing object property information associated with data object 136 stored in memory storage area 126. Data object information can include a data object information dataset. Moreover, the location of the clusters/block associated with an object stored in area 126 can as well be considered as part of the object property that can be stored in area 128. In the described embodiment, the data object information dataset can provide an overview of the core properties of object 136. These core properties can include, for example, the size of the data component of object 136 and object associations which can be used to associate data objects as well as to describe hierarchical file systems on devices. It should be noted that data object properties can provide a mechanism for exchanging object-describing information separate from the objects themselves. One of the benefits of object properties is to permit the rapid enumeration of large storages regardless of the file-system. It should be noted that other properties may include any of the metadata info (e.g. object author, date and or time of object creation, digital rights attached to object and so on) as well as any other property 'defined externally to the object itself' (e.g. number to times the object was played, date/time when the object was copied to and/or inserted in LSD and so on).

In order to assure that objects stored in mass storage area 126 have a consistent object representation in area 128, synchronizer 138 (that can reside in LSD 104 or HD 102) can be used to update the object properties stored in area 128 corresponding to the updated object stored in the mass storage area 126. By updating it is meant any operation that can be performed on or to a data file stored (or to be stored) in mass storage area 126 that alters or modifies any characteristic associated with a data object. It should be noted that the number and nature of the properties being managed by the OBMS 132 and offered via the 'object representation' (i.e. handled by synchronizer 138) can be either defined by ancillary application 120 or by LSD 104 itself, or by both. Also the object properties managed by OBMS 132 may well differ depending on the objects themselves. Such object properties can include, for example, name, size, authors for some, user generated tags for other, and a number of time the content has been played. It should be note that once content is identified, such as by the HD 102 or LSD 104, then different sets of information associated with that content can be managed by OBMS 132

Synchronizer 138 can perform what is referred to as a bi-directional synchronization operation. For example, a write command on mass storage area 126 conveyed via mass storage path 107 can result in a new or updated object available for read and or manipulation via the object (OB) path 111. Moreover, a write related command (e.g., update or move an object) conveyed by way of OB interface 109 can result in new data being available for read or manipulation via the mass storage path 107. Therefore, a 'write'-based command (e.g. modify object, move object) conveyed by way of the OB interface 109 (using at least driver 110) can be synchronized with area 128 by synchronizer 138.

Therefore, when the write-related command (e.g. modify or move object) is conveyed to LSD 104 via the OB path 109, the object can be written to the mass storage area 126 while the corresponding properties are updated by way of synchronizer 138 in area 128. However, since area 126 is managed by HDFS 108 (management that can include caching any FAT information on HD 102) HDFS 108 would not be aware of any modifications occurring internally on area 126. Therefore in order to assure that the properties are ultimately synchronized in area 128 when an object is written to in the mass storage area 126, an internal write command using placeholders of a pre-determined size located in mass storage area 126 that are recognized by HDFS 108 can be used. Such placeholders are described in more detail in U.S. patent application Ser. No. 12/019,573 filed on Jan. 24, 2008 entitled "DISTRIBUTED STORAGE SERVICE SYSTEMS AND ARCHITECTURE" by Nochimowski et al.

Figure 2:
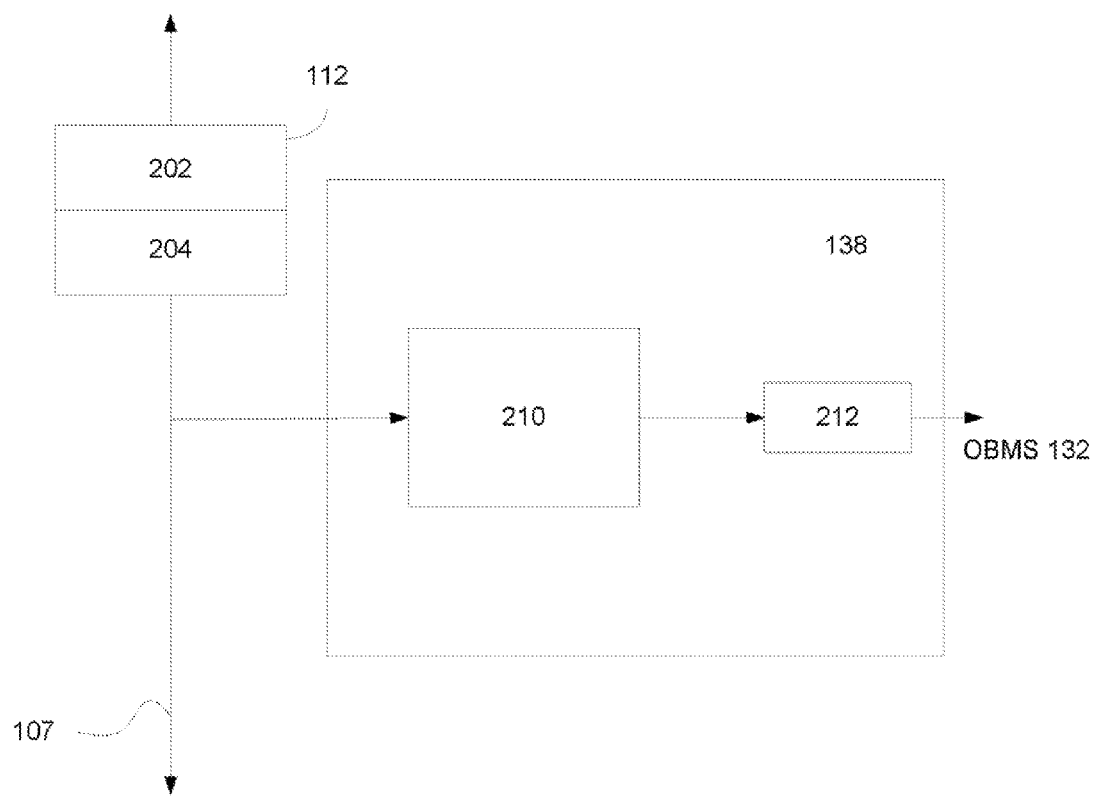
FIG. 2 an embodiment of a synchronizer.

FIG. 2 shows a particular embodiment of synchronizer 138 in accordance with an embodiment of the invention. Synchronizer 138 can be coupled to mass storage path between HD 102 and LSD 104 and is therefore able to observe any LSD block command 112 that is passed from HD 102 to LSD 104. In the described embodiment, LSD block command 112 is a FAT block-based command that can include information and data in data portion 202 and can include a command instruction portion 204 that instructs controller 122 in the type of operation (read, write, etc.) to be performed. Synchronizer 138 can include at least object property extraction unit 210 arranged to extract salient properties of an object. Extraction unit 210 can extract appropriate object properties (filename, format, file size, etc.) which is passed to a information unit 212. At any time, the updated information can be passed to OBMS 132 that can, in turn, identify and update the appropriate data object property in area 128.

Moreover, when data is written to mass storage area 126, since synchronizer 138 comprehends the 'FAT structure' of the data written to mass storage area 126, synchronizer 138 can observe LSD block command 112 and identify and update object properties 'on the fly'. Furthermore, synchronizer 138 can as well identify any patterns in the host block commands and deduce appropriate properties along the lines described in U.S. patent application Ser. No. 12/059,107 filed on Mar. 31, 2008 entitled "DATA USAGE PROFILING BY LOCAL STORAGE DEVICE" by Nochimowski et al. or U.S. patent application Ser. No. 12/123,252 entitled "DATA INDEXING BY LOCAL STORAGE DEVICE" filed May, 19, 2008 by Nochimowski et al. For example, data extraction unit 210 can take the form of usage data collector 210. Usage data collector 210 can observe commands 112 and, based thereon, determines data access characterizations such as, for example, usage counters to be stored as properties in the storage area 128. While commands 112 are provided to the flash manager 130 of the controller 122 acting at the behest of HDFS 208, in other examples, commands or other signals are provided from the HD 102 to the LSD 104 that are not as a result of HDFS operations. For example, such command or other signals may be provided based on other operations, such as driver level operations that are not as a result of HDFS operations. The data access characterizations 206 may be inferred by the usage data collector 210 based on the frequency of read and/or write operations to characterize the data access.

In any case, synchronizer 138 can operate asynchronously or in the background and read from area 126 to identify any properties that require synchronization.

Figure 3:
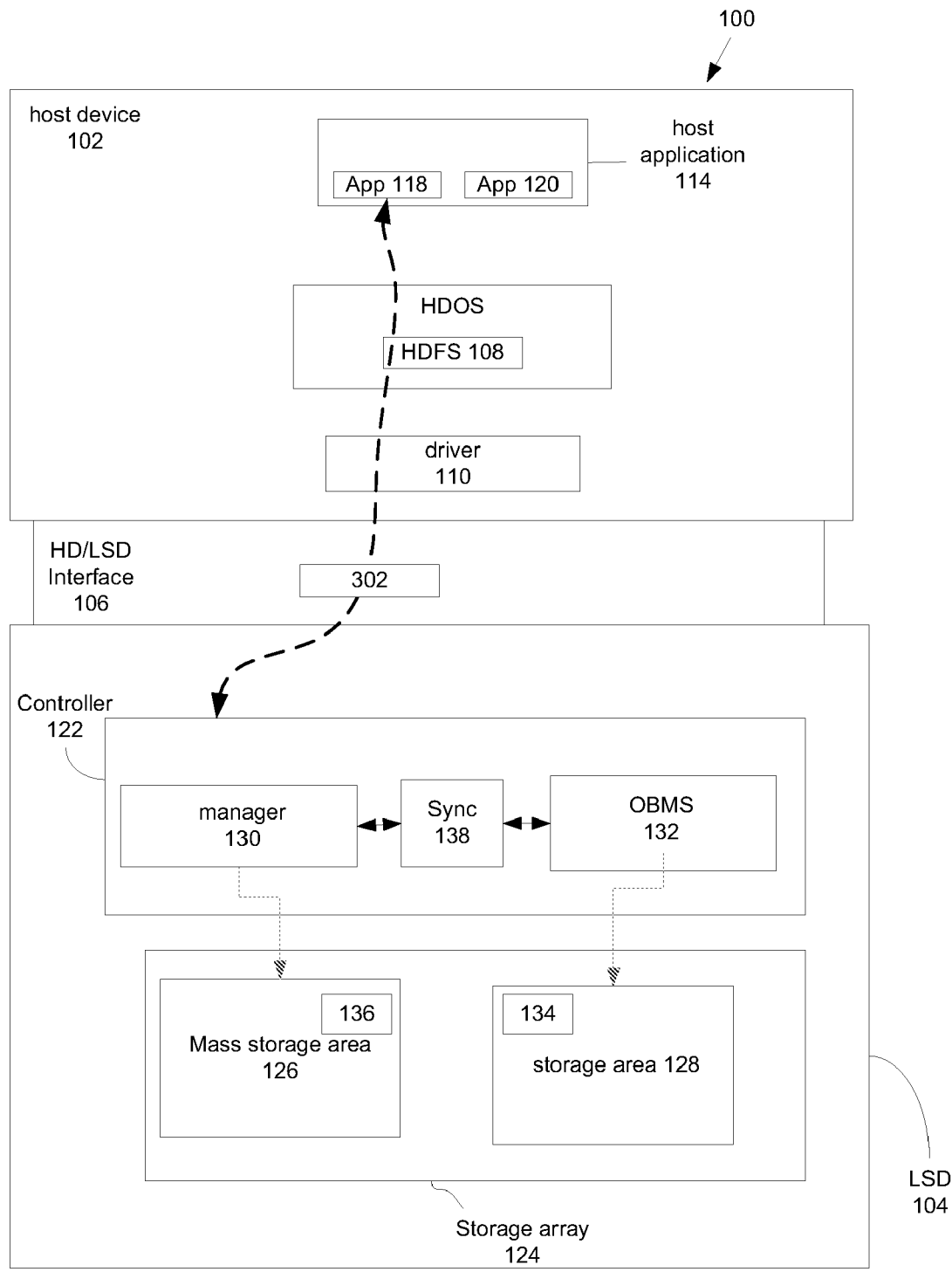
FIGS. 3 through 4 illustrate various operations that can be performed in the context of the described embodiments.

FIG. 3 shows core application 118 executing a core service (such as reading an MP3 file) that requires reading data stored in mass storage area 126. by read command 302 conveyed by way of the mass storage path 107 to LSD 104. Synchronizer 138 determines that since no properties of the accessed object is changed and therefore there is no need to update corresponding properties in area 128 by OBMS 132 (unless, for example, a counter is updated)

Figure 4:
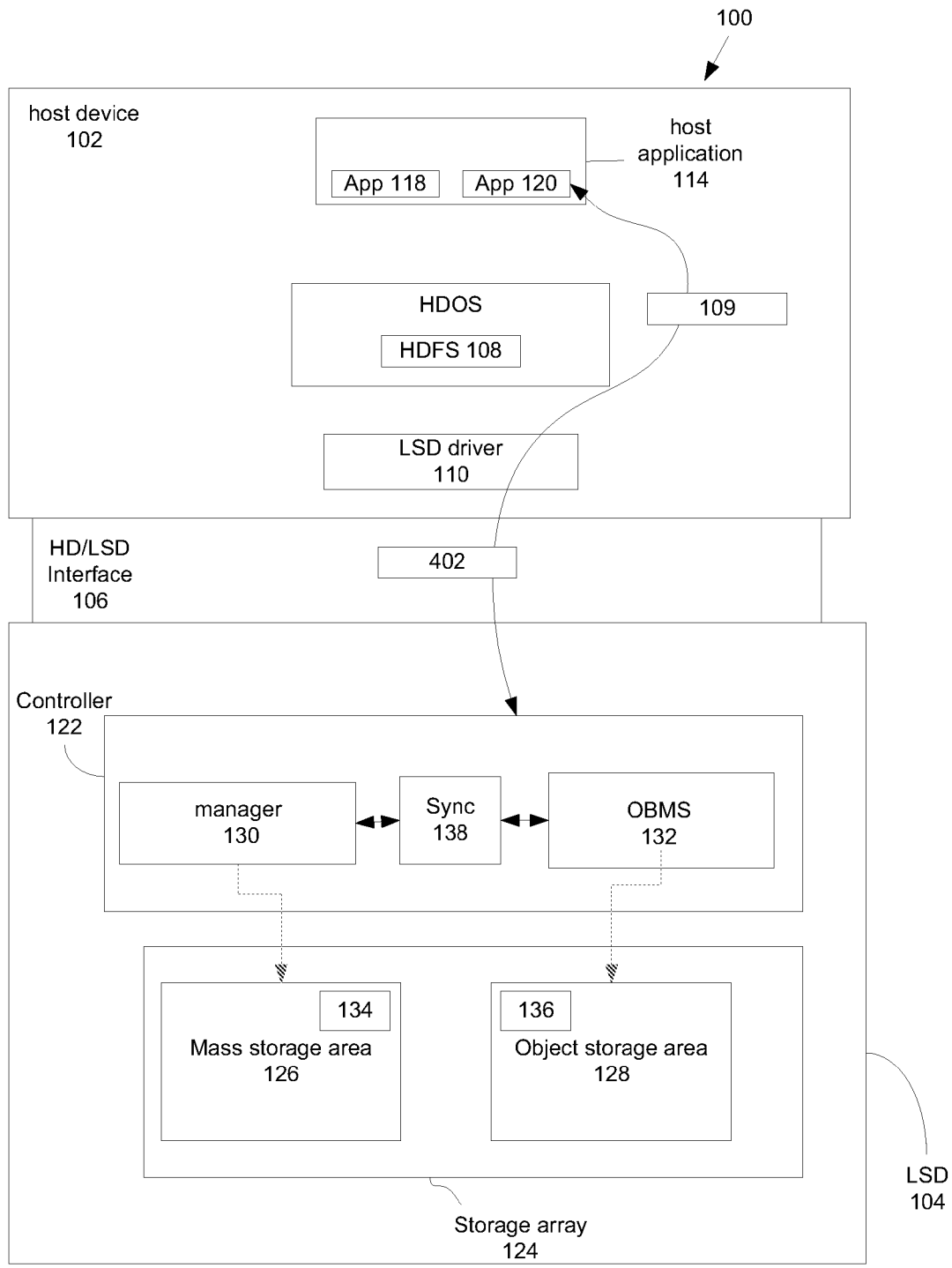

FIG. 4 illustrates the situation where HD 102 has issued a write command 402 (or any other command that will result in modifying object stored in mass storage area 126) conveyed to LSD 104 by way of mass storage path 107. Synchronizer 138 observes that properties associated with an object in mass storage area 126 will be modified by the execution of command 108 and responds by causing OBMS 132 to update object properties stored in area 128. It should be noted that synchronizer 138 can also regularly check (in the background, for example), the status of content in mass storage area 126 by periodically and regularly reading into mass storage area 126 to determine whether any modifications have occurred to objects stored therein. In some embodiments, synchronizer 138 can identify patterns of mass storage area 126 access and based upon those patterns deduce properties of the object stored in mass store area 126. In any case, OBMS 132 updates the appropriate object properties stored in storage area 128.

Figure 5:
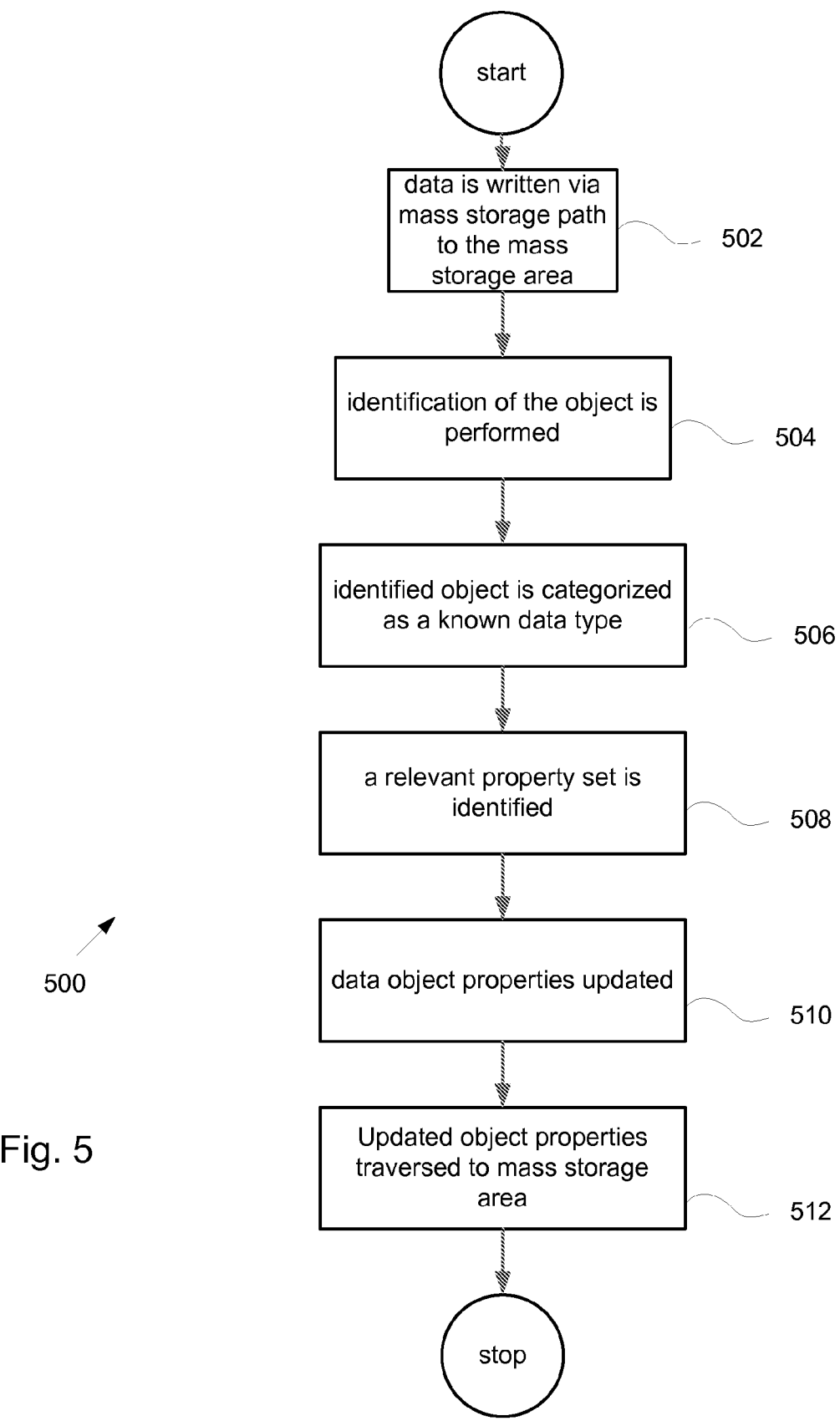
FIG. 5 shows a flowchart in accordance with an described embodiment.

FIG. 5 illustrates a flowchart representing a process 500 in accordance with one of the described embodiments. At 502, data is written via mass storage path to the mass storage area. At 504, identification of the object is performed. In the described embodiment, the identification can be carried out by the synchronizer in any number of ways. For example, the object can be identified using techniques described in U.S. patent application Ser. No. 12/059,107 filed on Mar. 31, 2008 entitled "DATA USAGE PROFILING BY LOCAL STORAGE DEVICE" and/or U.S. patent application Ser. No. 12/123,252 entitled "DATA INDEXING BY LOCAL STORAGE DEVICE" filed May, 19, 2008 by Nochimowski et al. For example, the identification can be performed by observing the data flow over the HD/LSD interface, or recognizing data access patterns or reading directly from the mass storage area (usually, in the background). Once the object has been identified, the identified object can be categorized as a known data type (e.g. MP3, JPEG, MP4 or any proprietary type) at 506. Once the object has been categorized, a relevant property set can be identified at 508. The property set relevant to the identified object is required for the synchronizer to manage the property set per object type. The property set can be set either dynamically by the ancillary services application or can be statically predefined by the LSD controller. For example, for an MP3 object, the managed properties can be at least author, file size etc. At 510, the synchronizer updates object property storage area by creating the appropriate 'entries' via object management system (OBMS) for the given object based upon the properties managed. At 512, using the FAT-structure awareness, the synchronizer can traverse the data written into object property storage area to the mass storage area to fill in these entries with the appropriate properties.

Figure 6:
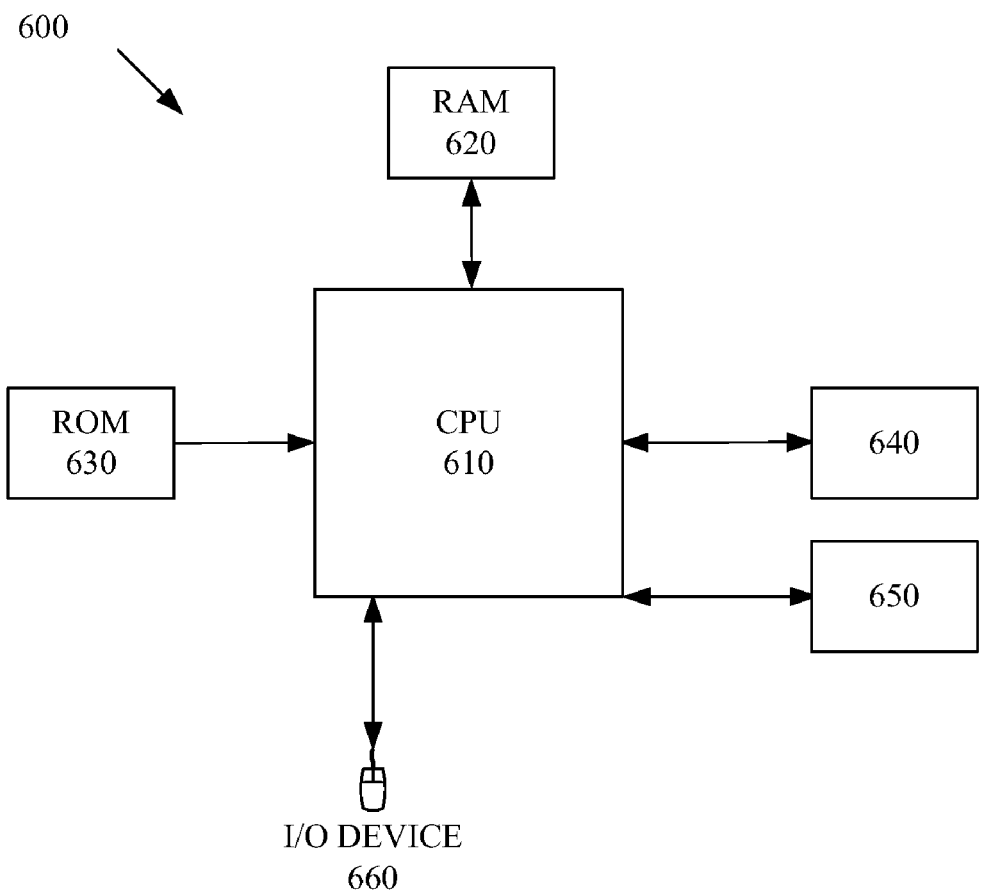
FIG. 6 shows a representative media network in accordance with the described embodiments.

FIG. 6 shows a representative system 600 illustrating additional components typically found in host device 602. System 600 includes central processing unit (CPU) 610, random access memory (RAM) 620, read only memory (ROM) 630, and primary storage devices 640 and 650. As is well known in the art, ROM 630 acts to transfer data and instructions unidirectionally to the CPU 610, while RAM 620 is used typically to transfer data and instructions in a bi-directional manner. CPU 610 may generally include any number of processors. Both primary storage devices 640 and 650 may include any suitable computer-readable media. CPUs 610 are also coupled to one or more input/output devices 1060 familiar to those of skill in the computer hardware and software arts.

In the described embodiment, mobile devices (e.g., portable media devices) can communicate with one another. This type of communication can be referred to as peer-to-peer interaction. In this regard, one mobile device can communicate (e.g., unicast) directly with another mobile device. In another example, one mobile device can communicate (e.g., broadcast, anycast or multicast) to a plurality of other mobile devices. In the peer-to-peer environment, one mobile device can communicate with one or more other electronic devices (whether mobile or stationary) in the immediate vicinity. Data sharing can be performed when such communication is available.

Data transfer could be between a mobile device and a computing device, such as a home computer or another mobile device. Typically, the mobile device and the computing device would be associated with a particular user. For example, when the mobile device is within range of a home computer (or a home network), data transfer can be performed between the mobile device and the home computer. Data transfer could also be between two or more mobile devices, or between two or more non-mobile devices. The data transfer can be automatic without any user action or can alternatively require manual approval by a user. The network devices can be associated with one another via an identification number or other suitable mechanism.

A mobile device or non-mobile device capable of receiving, transmitting and/or storing data may be referred to as a "data device." The manner by which the data arrives at the data device can depend upon implementation. For example, the data can be directly transferred to the data device, or the data can be indirectly transferred to the data device. For example, the data transfer can be between one data device to another data device. Alternatively, one data device can cause another data device to transfer desired data to a recipient data device.

The shared data can be transferred to a recipient device by file transfer or streaming. The data transferred can be received by one or more data devices. Examples of data devices include a media player, PDA, a speaker unit, a wireless transmitter/receiver unit, etc. Users of data devices can also create and distribute content through data sharing. The streaming can be limited so as to restrict the number of data devices simultaneously receiving the data. On the other hand, if the users of the data devices are subscribers to the streaming content (i.e., have a subscription), then the streaming can be unlimited as to subscribers. Storing some portion of the media item content associated with the media item metadata may also be done to facilitate the streaming of media item content. For example, a user could begin playing such a previously stored portion of the media item content before streaming of the remaining content even begins.

Data can be shared after being purchased. For example, a recipient could purchase data from a remote server. The remote server would then cause the purchased data to be delivered to the recipient's data device. The purchase can be performed in real-time or can be deferred until a later point in time. Thereafter, the purchased data can be shared from the recipient's data device to another data device.

For example, in the work environment or other network environment, as a user comes into an employer's office to work, the user's mobile device can transfer data to the user's work computer or to a network server for the office. The data transfer can be automatic without any user action or can alternatively require manual approval by a user. The user of the mobile device can also communicate with mobile devices of coworkers or other users of the network to exchange data.

Regardless of the particular environment, the data transfer can be wireless. The wireless data transfer can be facilitated by a wireless network. One mobile device could wirelessly transmit data in a unicast fashion from one mobile device to another mobile device or stationary computing device. Still further, one mobile device could wirelessly transmit data in a multicast or broadcast fashion to a plurality of other mobile devices. It should be noted that any home-server computer can reside on any of a number of other data storage devices in a network to which computing device belongs.

Different embodiments or implementations may yield various advantages. One such advantage is that legacy devices can be added or removed without consideration of modifying system hardware. Another advantage is that it can be used with any host computer without modification therefore reducing the cost and increasing the applicability of the invention.

The many features and advantages of these embodiments are apparent from the written description and, thus, it is intended by the appended claims to cover all such features and advantages. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A local storage device, the local storage device configured for communication with a host device having a host application and a host device file system arranged to generate a block command, the local storage device, comprising:
   a data storage array, wherein the data storage array is arranged to include a first portion and a second portion, the first portion being a mass storage portion arranged to store logical data blocks and corresponding data objects, the second portion being arranged to store a predetermined set of data object properties corresponding to the logical data blocks stored in the first portion; and
   a controller in communication with the data storage array and having a synchronization unit, the controller configured to manage data stored in the data storage array as logical block data via a first logical interface and data objects corresponding to the data stored as logical data blocks via a second logical interface, wherein the first and the second logical interfaces are in communication with the data storage array; and
   wherein, when at least some of the data stored as logical data blocks is modified by way of the first logical interface, the synchronization unit of the controller is configured to update the predefined set of data object properties correspondingly such that the data object properties and modified data are synchronized and the modified data is accessible by way of both the first and the second logical interfaces.

2. The local storage device of claim 1, wherein the predetermined set of data object properties is defined by the local storage device.

3. The local storage device of claim 2, wherein the predetermined set of data object properties is defined by the host device.

4. The local storage device of claim 1, wherein the predetermined set of data object properties includes an object name, an object size, and a number of times the object has been accessed.

5. The local storage device of claim 1, wherein the synchronization unit is configured to update the predetermined set of data object properties by recognizing data access patterns.

6. The local storage device of claim 1, wherein the synchronization unit is configured to update the predetermined set of data object properties based on an observed data flow over the first logical interface.

7. A local storage device configured for communication with a host device having a host application and a host device file system, the local storage device comprising:
  a data storage array, wherein the data storage array is arranged to include a first portion and a second portion, the first portion being a mass storage portion arranged for logical data blocks and corresponding data objects, the second portion being arranged for a predetermined set of data object properties corresponding to the logical data blocks in the first portion; and
  a controller in communication with the data storage array and having a synchronization unit arranged to update a predetermined set of data objects, the controller configured to manage data stored in the mass storage portion of the data storage array as logical data blocks via a first logical interface and configured to manage data objects corresponding to the data stored as logical data blocks via a second logical interface, wherein the first and the second logical interfaces are in communication with the data storage array;
  wherein, when a write-related command is received via the second logical interface, the synchronization unit of the controller is configured to update a data object in the first portion of the storage array and update the predefined set of data object properties corresponding to the updated data object.

8. The local storage device of claim 7, wherein the predetermined set of object properties is defined by the local storage device.

9. The local storage device of claim 7, wherein the predetermined set of object properties is defined by the HD.

10. The local storage device of claim 7, wherein the predetermined set of object properties includes an object name, an object size, and a number of times the object has been accessed.

11. A method, comprising:
  in a local storage device configured for communication with a host device, the local storage device having a data storage array and a controller, wherein the data storage array is arranged to include a first portion and a second portion, the first portion being a mass storage area to store logical data blocks and corresponding data objects, the second portion being arranged to store a predetermined set of data object properties corresponding to the logical data blocks stored in the first portion, and the controller in communication with the data storage array and having a synchronization unit, the controller:
  receiving modified data from the host device over a first logical interface and storing the modified data in the first portion of a memory array in logical data blocks;
  managing, over a second logical interface, data objects in the mass storage area corresponding to the logical data blocks; and
  when at least some of the data stored as logical data blocks is modified by way of the first logical interface, updating a predetermined set of data object properties of a data object corresponding to the modified data by way of the second logical interface, wherein the updated predetermined set of data object properties is stored in a second portion of the memory array.

12. The method of claim 11, wherein updating the predetermined set of data object properties comprises updating the predetermined set of data object properties based on recognizing data access patterns.

13. The method of claim 11, wherein updating the predetermined set of data object properties comprises updating the predetermined set of data object properties based on observing a data flow over the first logical interface.

14. The method of claim 11, wherein the predetermined set of object properties is defined by a local storage device.

15. The method of claim 11, wherein the predetermined set of object properties is received from the host device.

16. The method of claim 11, wherein updating the predetermined set of data object properties comprises updating at least one of an object name, an object size, or a number of times the object has been accessed.

17. The method of claim 11, further comprising:
  receiving a write-related command via the second logical interface;
  updating a data object in the mass storage area; and
  updating the predefined set of data object properties corresponding to the updated data object.

* * * * *